United States Patent [19]

Tsuzuki et al.

[11] 4,403,223

[45] * Sep. 6, 1983

[54] INK-ON-DEMAND TYPE INK-JET PRINTER

[75] Inventors: Mitsuo Tsuzuki; Michihisa Suga, both of Tokyo, Japan

[73] Assignee: Nippon Electric Co., Ltd., Tokyo, Japan

[ * ] Notice: The portion of the term of this patent subsequent to Jul. 28, 1998, has been disclaimed.

[21] Appl. No.: 234,784

[22] Filed: Feb. 17, 1981

Related U.S. Application Data

[63] Continuation of Ser. No. 120,579, Feb. 11, 1980, Pat. No. 4,281,333.

[30] Foreign Application Priority Data

| | | | |
|---|---|---|---|
| Feb. 14, 1979 | [JP] | Japan | 54-16652 |
| Feb. 14, 1979 | [JP] | Japan | 54-16653 |
| Feb. 22, 1979 | [JP] | Japan | 54-20425 |
| Mar. 22, 1979 | [JP] | Japan | 54-33746 |
| Apr. 11, 1979 | [JP] | Japan | 54-44020 |
| Apr. 12, 1979 | [JP] | Japan | 54-44651 |
| May 4, 1979 | [JP] | Japan | 54-55023 |
| May 4, 1979 | [JP] | Japan | 54-55024 |
| May 4, 1979 | [JP] | Japan | 54-55025 |

[51] Int. Cl.[3] .......... G01D 15/18

[52] U.S. Cl. .......... 346/1.1; 346/140 R

[58] Field of Search .......... 346/1, 75, 140 PD, 140 IJ

[56] References Cited

U.S. PATENT DOCUMENTS

| | | | |
|---|---|---|---|
| 3,747,120 | 7/1973 | Stemme | 346/140 PD X |
| 3,846,800 | 11/1974 | Chen | 346/75 X |
| 4,050,077 | 9/1977 | Yamada et al. | 346/75 |
| 4,222,060 | 9/1980 | Sato et al. | 346/140 IJ |

*Primary Examiner*—George H. Miller, Jr.
*Attorney, Agent, or Firm*—Laff, Whitesel, Conte & Saret

[57] ABSTRACT

A demand ink-jet printer uses droplets of conductive ink for recording on a recording medium. In greater detail, an ink chamber, filled with conductive ink, has a nozzle in one wall and a piezoelectric member attached to another wall. Droplets of ink are driven out the nozzle in response to a driving pulse applied to the piezoelectric member. The energy content of the driving pulses controls both the size of the droplets and the potential of a charging voltage applied to the droplets. This way, the combined charge and size may be held constant so that large or small drops may be generated to produce half-tone pictures and the droplets may be electrostatically deflected accurately, despite the variance in droplet size.

15 Claims, 26 Drawing Figures

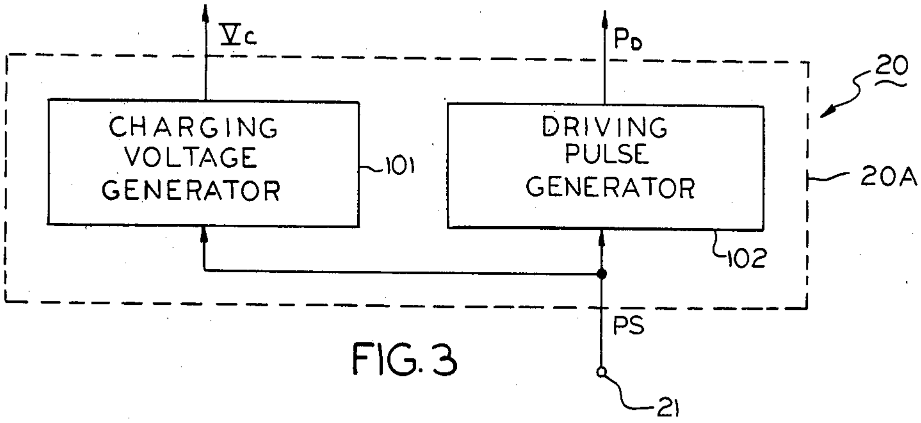
FIG.3
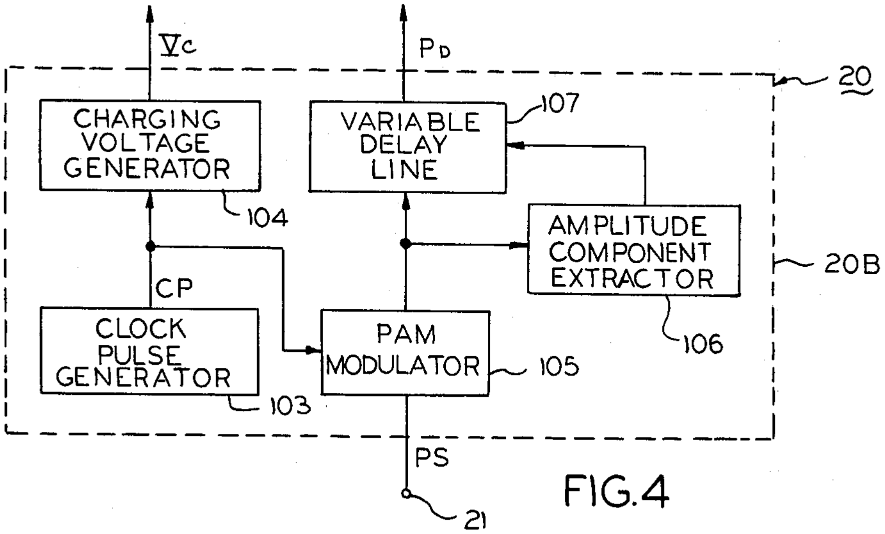
FIG.4
FIG.5A FIG.5B FIG.5C FIG.5D
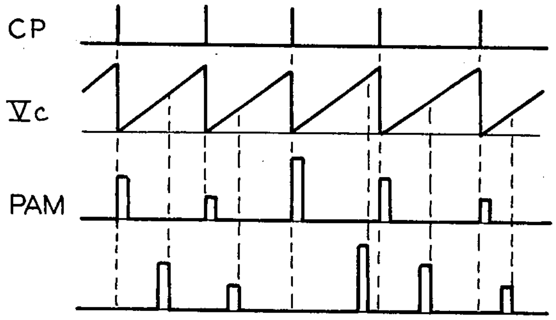
FIG.6A FIG.6B FIG.6C FIG.6D
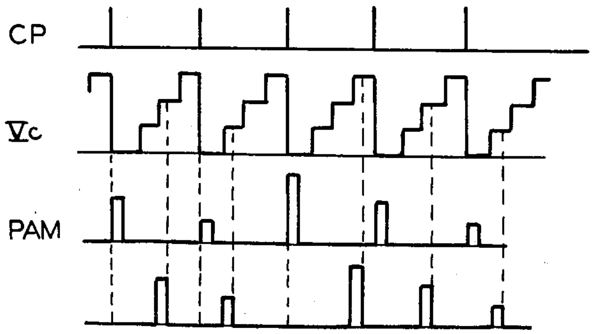

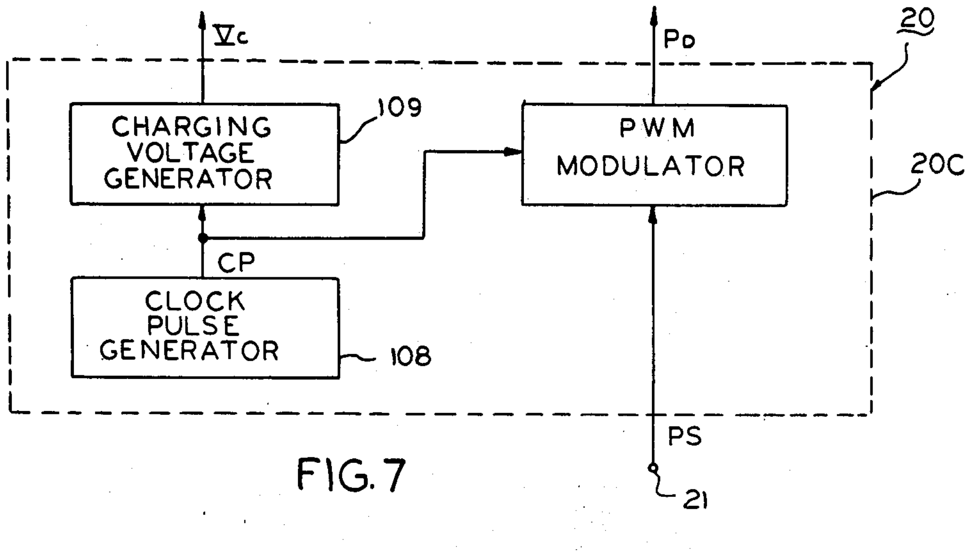
FIG. 7
FIG. 8A
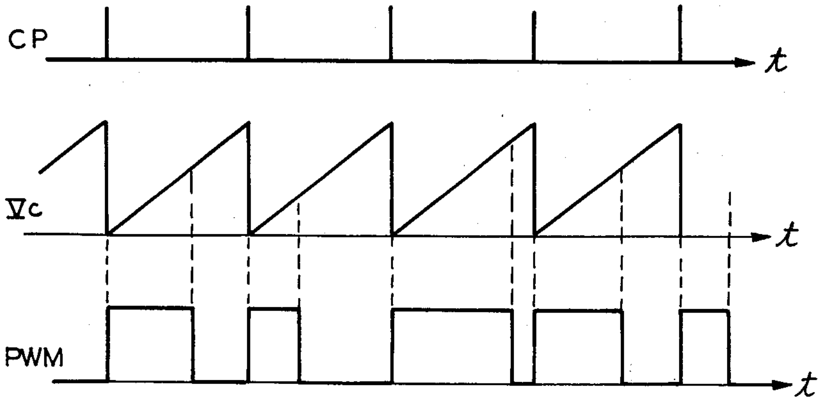
FIG. 8B
FIG. 8C
FIG. 9A
FIG. 9B
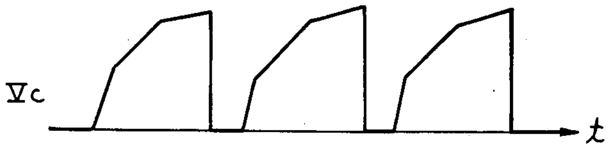

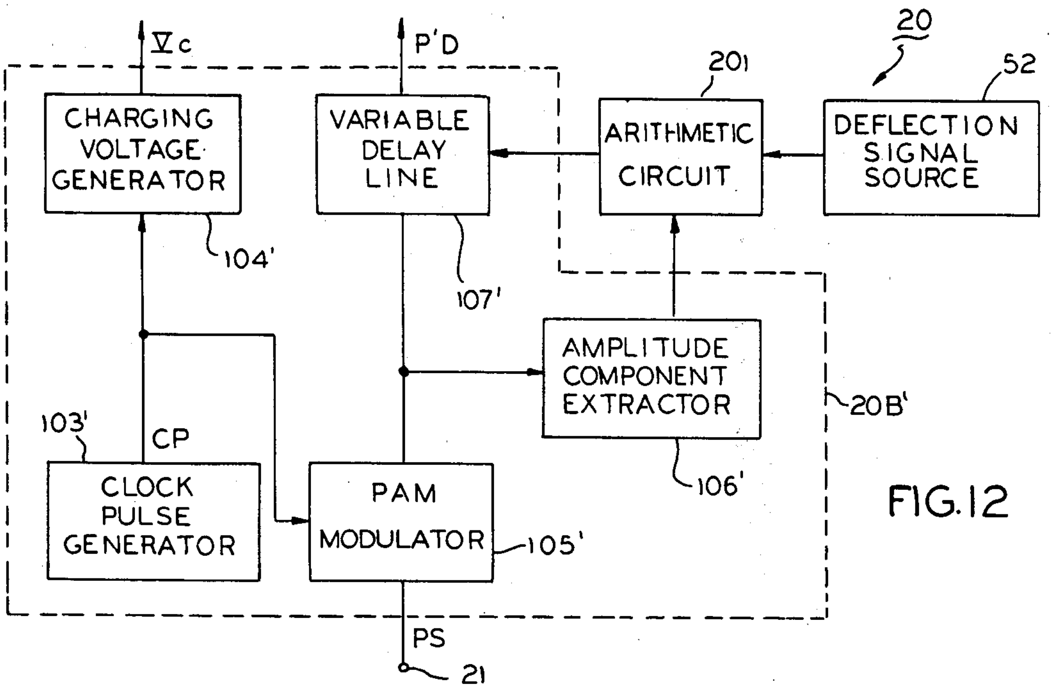
FIG.12
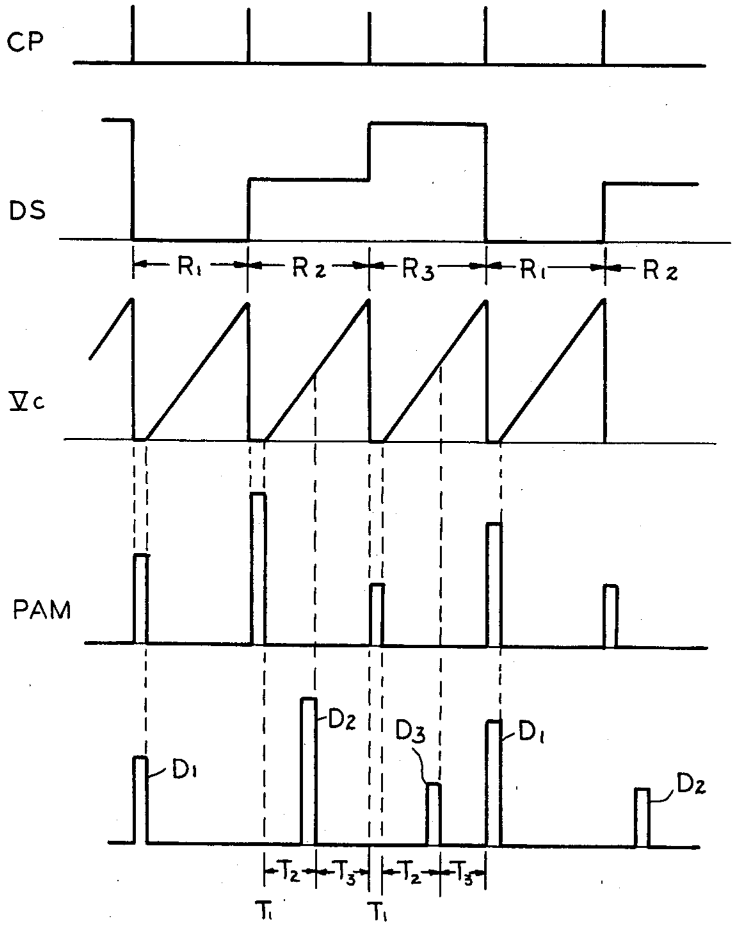
FIG.13A
FIG.13B
FIG.13C
FIG.13D
FIG.13E

INK-ON-DEMAND TYPE INK-JET PRINTER

This is a continuation of application Ser. No. 120,579, filed Feb. 11, 1980 now U.S. Pat. No. 4,281,333.

This invention relates to an ink-on-demand type ink-jet printer in which ink droplets are driven toward a paper or other medium each time that a driving pulse is applied to a piezoelectric member attached to one wall of an ink chamber.

Various types of ink-jet printers have been proposed, such as those described in an article entitled "Ink Jet Printing" by Fred J. Kamphoefner published in the IEEE Transactions on Electron Devices. Vol. Ed-19, No. 4, April 1972, pp. 584–593 (Reference 1). An ink-jet printer of the ink-on-demand type is described in detail in U.S. Pat. No. 3,946,398, entitled "Method and Apparatus for Recording with Writing Fluids and Drop Projection Means Therefor" issued to E. L. Kyser, et al., and U.S. Pat. No. 4,106,032 entitled "Apparatus for Applying Liquid Droplets to a Surface by Using a High Speed Laminar Air Flow to Accelerate the Same 38 issued to M. Miura, et al. Some of the many advantages of the ink-jet printer of ink-on-demand type are that it is simple in construction, all the droplets driven out of the ink chamber are projected to a printing surface without requiring a withdrawal of any droplets, and the droplet size may be varied by controlling the energy content of the driving pulse applied to the piezoelectric member, thereby making it possible to record a half tone.

In the conventional ink-on-demand type ink-jet printer, however, an electrostatic deflection method cannot be used for deflecting the ink droplets, because some of the droplets are different in size and weight. When a deflection field is applied to the different droplets, the resulting deflection varies according to the droplet size (weight).

The velocity of the droplets in the ink-jet printer of ink-on-demand type is lower than the velocity in the other types of ink-jet printers. As a result, the different-sized droplets cannot be uniformly accelerated, which directly affects the stability of the printing.

It is, therefore, an object of this invention to provide new and improved ink-jet printers of the ink-on-demand type in which an electrostatic deflection may be applied for deflecting the ink droplets.

It is another object of this invention to provide new and improved ink-jet printers of ink-on-demand type capable of reproducing fine letters and patterns.

According to one aspect to this invention, an ink-jet printer records, or prints, with droplets of conductive ink on a recording medium. The printer has an ink chamber filled with conductive ink. The chamber also has a nozzle and a piezoelectric member attached to one wall thereof. Droplets of ink are driven out the nozzle responsive to driving pulses applied to the piezoelectric member. The size of the droplets is a function of the energy content of the driving pulses. The droplets are charged by a voltage which is applied as they are driven out of the nozzle and that voltage is a function of the energy content of the driving pulses.

Other features and advantages of this invention will be apparent from the following description of preferred embodiments of this invention taken in conjunction with the accompanying drawings, wherein:

FIGS. 3 and 4 are block diagrams of first and second examples of the driving pulse generator and charging voltage generator used in the first embodiment shown in FIG. 1;

FIGS. 5A through 5D and 6A through 6D are waveform diagrams of signals appearing at various parts of the second example shown in FIG. 4;

FIG. 7 is a block diagram of a third example of the driving pulse and charging voltage generator used in the first embodiment shown in FIG. 1;

FIGS. 8A, 8B, 8C, 9A and 9B are waveform diagrams of signals appearing at various parts of the third example shown in FIG. 7;

FIG. 12 is a block diagram of a second example of the same generator used in the second embodiment shown in FIG. 10; and FIGS. 13A through 13E are waveform diagrams of signals appearing at various parts of the second example of the generator shown in FIG. 12.

Figure 1:
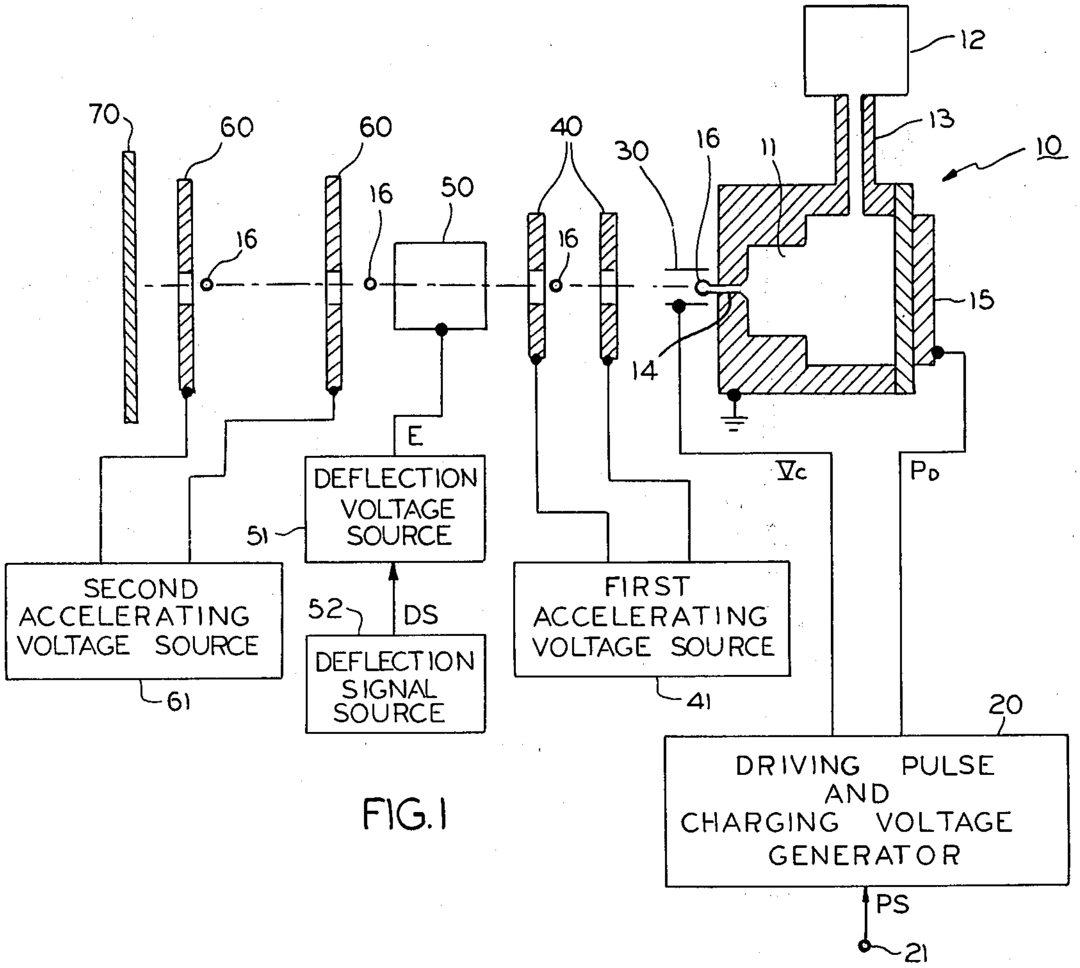
FIG. 1 is a cross-sectional view of a first embodiment of this invention.

The first embodiment of the ink-jet printer shown in FIG. 1 includes a print head 10 having an ink chamber 11 which holds conductive ink. Ink is supplied to the chamber 11, from an ink reservoir 12 through a supply tube 13. A nozzle 14 is positioned at one side of the chamber 11, and a piezoelectric member 15 is mounted on the opposite side of the chamber. Piezoelectric member 15 temporarily reduces the volume of the chamber 11 each time that the member 15 is electrically pulsed by a driving pulse $P_D$ supplied from a driving pulse/-charging voltage generator 20.

Piezoelectric member 15 also creates a pressure pulse in the print head chamber 11 which drives out an ink droplet 16, each time a driving pulse $P_D$ is applied from the pulse generator 20 to the piezoelectric member 15. The droplet size is a function of the energy content of the driving pulse $P_D$, which may be varied by adjusting variables, such as pulse width and pulse amplitude.

Charging electrodes 30 are provided adjacent the nozzle 14. A charging voltage $V_c$ from the generator 20 may be applied to the electrodes 30. First accelerating electrodes 40 which are adjacent electrodes 30 may be charged to a first accelerating voltage from a first accelerating voltage source 41. Deflection electrodes 50, which are adjacent the first accelerating electrodes 40, may be charged with a deflection voltage E generated in a deflection voltage source 51. Second accelerating electrodes 60, which are adjacent deflection electrodes 50, may be charged by a second accelerating voltage from a second voltage source 61.

After an ink droplet 16, having a weight m, is driven out the print head 10, it is charged while passing between the charging electrodes 30. The charge value q is proportional to the charging voltage $V_c$. The charged ink droplet 16 is then accelerated by the first accelerating electrodes 40. As it passes through a space between the deflection electrodes 50, it is deflected a distance which is determined by the weight m, the charge value q and the deflection voltage E. The deflected ink droplet 16 is again accelerated by the second accelerating electrodes 60 and then it strikes a printing surface of a medium, such as paper 70.

Figure 2:
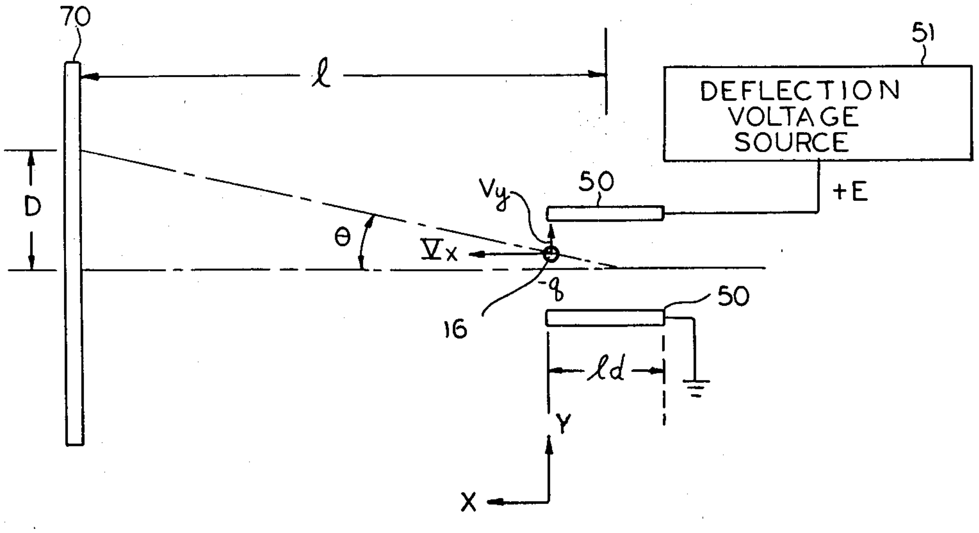
FIG. 2 is a diagram which illustrates the principle of this invention.

The ink droplet 16 (FIG. 2) is deflected by an angle $\theta$ while passing through the space between the deflection electrodes 50, inducing a Y-direction velocity component $V_y$ in the droplet 16. The deflected droplet 16 thus strikes the printing surface of the paper 70 at a point which is a deflection distance D from its original path. The deflection distance may be calculated in the following manner:

$$D = l \cdot \tan \theta = l \cdot V_y / V_x$$

where l is a distance between the deflection electrodes 50 and the printing surface of the paper 70, and "$V_x$" is the X-direction velocity of the deflected droplet at the exit of the deflection electrodes 50. Because the change in X-direction velocity component $V_x$ due to the passage of the droplet 16 through the deflection space is negligible, the Y-direction component $V_y$ may be approximate as follows:

$$V_y = (qE)/m = l_d / V_x$$

where symbol $l_d$ is the length of the deflection space. Therefore, the deflection distance D may be approximated as follows:

$$D = l \cdot V_y / V_x = qE/m \cdot (l \cdot l_d) / V_x^2$$

According to the invention, to maintain a constant deflection distance D when the weight m of the droplet 16 is varied without changing the voltage E applied to the deflection electrodes 50, the ratio q/m must be maintained at a fixed value. Assuming that the fluctuation in the velocity $V_x$ of the droplets 16 due to the variation in the droplet size is considered to be negligible, the deflection may be accomplished by varying the charge value q in proportion to the weight m of the droplet 16. In this manner, the electrostatic deflection method may be used for deflecting droplets differing from each other in droplet size and weight, by varying the charge value q in proportion to the weight m. Also, the different sized droplets may be uniformly accelerated.

The generator 20 (FIG. 1) produces, upon receipt of an input picture signal PS supplied from an input terminal 21, the driving pulse $P_D$ and the charging voltage $V_c$. The charging voltage $V_c$, which determines the charge value q, varies in proportion to the droplet weight m, which is determined by the energy content of the driving pulse $P_D$.

One embodiment 20A (FIG. 3) of the driving pulse and charging voltage generator 20 comprises a charge voltage generator 101 for generating the charging voltage $V_c$ proportional to the level L (not shown) of the picture signal PS. A driving pulse generator 102 generates the driving pulse $P_D$. The pulse width and/or pulse amplitude of the driving pulse $P_D$ are varied in response to the picture signal level L so that the energy content C of pulse $P_D$, and the resulting droplet weight m, are proportional to the picture signal level L. Because of the charging voltage $V_c$ and the energy content C of the driving pulse $P_D$ are proportional to the picture signal level L, the ratio of $V_c/C$ may be maintained at a fixed value. Therefore, it is also possible to maintain the ratio of q/m at a constant level even when the droplet size is varied in response to changes in the picture signal level L. Thus, the different sized droplets 16 may be uniformly accelerated by the accelerating electrodes 40 and 60, and uniformly deflected by the deflection electrodes 50. The deflection distance D is a function of the magnitude of the deflection voltage E, which is controlled by a deflection information signal DS supplied from a deflection signal source 52 (FIG. 1).

Another embodiment 20B (FIGS. 4 through 6) of the driving pulse and charging voltage generator 20 comprises a clock pulse generator which generates a clock pulse CP, as shown in FIGS. 5A and 6A, and a charging voltage generator 104 which generates a charging voltage $V_c$ having saw-tooth waveform, as shown in FIG. 5B, or having a step waveform, as shown in FIG. 6B. Charging voltage $V_c$ is applied to the charging electrodes 30 (FIG. 1). The clock pulse CP (FIG. 4) is applied to the charging voltage generator 104 and to a pulse-amplitude modulator 105. The pulse amplitude modulator 105 produces a PAM signal from the picture signal PS and clock pulse CP, as shown in FIG. 5C or 6C. The PAM signal is supplied to an amplitude-component extractor 106 which produces a control signal responsive to the amplitude component of the PAM signal. The control signal is supplied to a variable delay line 107, which is also supplied with the PAM signal from the modulator 105. Responsive to the receipt of this control signal, the variable delay line 107 delays the PAM signal by a period which is determined by the amplitude component of the PAM signal and produces a delayed PAM signal as shown in FIGS. 5D and 6D.

The delayed PAM signal is the driving pulse $P_D$, which is applied to the piezoelectric member 15 (FIG. 1). The piezoelectric member 15 produces droplets 16 which are proportional in size to the amplitude component of the delayed PAM signal. These droplets are driven out of the nozzle 14 at each trailing time of the delayed PAM signal. As clearly understood from FIGS. 5B and 5D, or 6B and 6D, the level of the charging voltage $V_c$ at the trailing time of the delayed PAM signal, depends on the delay time, which is related to the amplitude component. Thus, the charge value q of the droplet 16 varies in response to the amplitude component of the delayed PAM signal, which is related to the droplet weight m.

If the droplet weight m (droplet size) is not linearly related to the pulse-amplitude of the driving pulse $P_D$, the waveform of the charging voltage $V_c$ and the input vs. output characteristic of the amplitude-component extractor 106 must be modified to meet the droplet-weight vs. pulse-amplitude characteristic.

Yet another example 20C (FIGS. 7 and 8) of the driving pulse and charging voltage generator 20 comprises a clock pulse generator 108 and a charging voltage generator 109, which generate a clock pulse CP and a charging voltage $C_c$ respectively, as shown in FIGS. 8A and 8B, and correspond to the generators 103 and 104, respectively (FIG. 4). The clock pulse CP is applied to the charging voltage generator 109, and to a pulse-width modulator 110. The pulse-width modulator 110, which is supplied with the picture signal PS, produces a PWM signal, as shown in FIG. 8C. The pulse width of the PWM signal is a function of the picture signal level L. The charging voltage $V_c$, shown in FIG. 8B, has different values, depending on the timing of the trailing edge of the PWM signal and thus varies in response to the pulse width.

The PWM signal is the driving pulse $P_D$ supplied to piezoelectric member 15, which drives out a droplet at each of the trailing edges of the PWM signal. At each time that a droplet is driven out, a charging voltage proportional to the pulse width of the PWM signal is applied to the droplet, whereby the charge q is varied in response to the pulse width, i.e., the droplet weight m.

If the droplet weight m vs. pulse width w characteristic is not linear, as shown by a curve 111 in FIG. 9A, a signal having a waveform similar to the curve 111 is used as the charging voltage $V_c$, as shown in FIG. 9B.

Figure 10:
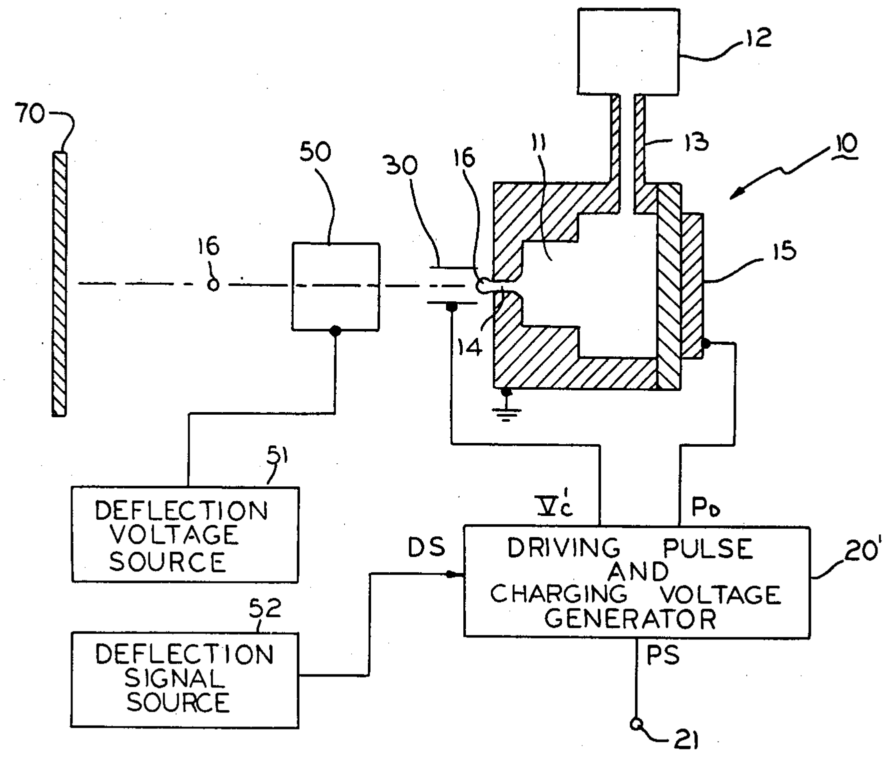
FIG. 10 is a cross sectional view of a second embodiment of this invention.

In FIG. 10, the second embodiment of the invention comprises the print head 10, the driving pulse/charging voltage generator 20', the charging electrodes 30, and the deflection electrodes 50. The head 10, and the electrodes 30 and 50 are identical to those in the first embodiment shown in FIG. 1. However, the deflection information signal DS is not supplied to the deflection voltage source 51, but is supplied to the generator 20'. The accelerating electrodes 40 and 60 are omitted in FIG. 10.

The generator 20' (FIG. 10) generates the charging voltage $V_c'$ and the driving pulse $P_D$, such tha the charging voltage $V_c'$ varies in proportion to both the energy content C of the pulse $P_D$ and the deflection information signal DS. The ratio q/m of the droplet 16, which is driven out of the nozzle 14 in response to the driving pulse $P_D$ and then charged in response to the charging voltage $V_c'$ is thus proportional to the deflection information signal DS.

The charged droplets 16 are passed through the deflection space between the deflection electrodes 50, which are charged with a fixed deflection voltage from the source 51. Thus, the droplet 16 may be deflected by a distance which is in proportion to the deflection information signal DS.

Figure 11:
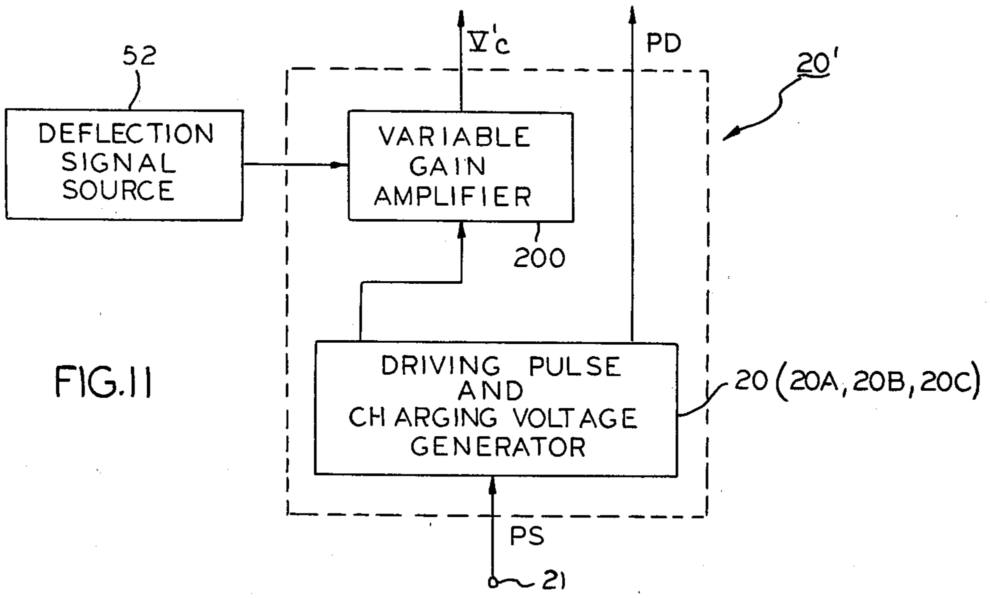
FIG. 11 is a block diagram of a first example of the driving pulse and charging voltage generator used in the second embodiment shown in FIG. 10.

Generator 20' (FIG. 11) comprises a generator 20 identical to generators 20A (FIG. 3), 20B (FIG. 4) or 20C (FIG. 7), and a variable-gain amplifier 200, which is supplied with the voltage $V_c$ and the deflection information signal DS from the generator 20 and the source 52, respectively. The voltage $V_c$ is controlled by the signal DS to produce the modified charging voltage $V_c'$, which is proportional to the energy content C of the driving pulse $P_D$ and to the deflection information signal DS.

A second example of the generator 20' (FIGS. 12 and 13) comprises a generator 20B' identical to the generator 20B shown in FIG. 4. The generator 20B' includes a clock pulse generator 103' for generating the clock pulse CP (FIG. 13A), a charging voltage generator 104' for generating charging voltage $V_c$ (FIG. 13C), a PAM modulator 105' for producing the PAM signal (FIG. 13D), an amplitude component extractor 106' and a variable delay line 107'. The structural elements 103' to 107' are identical to corresponding circuits 103 to 107 in FIG. 4, respectively.

The second example of the generator 20' further comprises an arithmetic circuit 201, which is supplied with the amplitude-component signal and the deflection information signal DS (FIG. 13B) from the extractor 106' and the deflection signal source 52, respectively. The arithmetic circuit 201 produces a delay-control signal representing the product of the amplitude-component signal and the deflection information signal DS.

The delay-control signal is applied to the variable delay line 107' to control the delay time. If the deflection information signal DS is zero, as shown by stepwave R1 in FIG. 13B, the delay time is zero, as shown by time $T_1$ in FIG. 13E, i.e., the PAM signal is passed through the variable delay line 107' without any delay so that the non-delayed PAM signal D1 (FIG. 13E) is produced and supplied as the driving pulse $P_D'$ to the piezoelectric member 15. As understood from FIGS. 13C and 13E, at the time when the non-delayed PAM signal D1 is applied to the piezoelectric member 15, i.e., at the trailing edge of the signal D1, the charging voltage $V_c$ is zero, so that the squirted droplet 16 is not charged. Thus, it passes through the deflection space without deflection.

If the deflection information signal DS is not zero, as shown by stepwaves R2 and R3 in FIG. 13B, the delay time is varied in response to the amplitude-component signal within time period ranges $T_2$ and $T_3$, respectively, as shown in FIG. 13E. The delayed PAM signals D2 and D3 are produced and supplied as the driving pulse $P_D'$ to the piezoelectric member 15. As understood from FIGS. 13C and 13E, at the trailing edges of the delayed PAM signals D2 and D3, the droplets are driven out and charged by the charging voltage $V_c$, which is responsive to the energy content, i.e., pulse amplitude of the driving pulse and the deflection information.

In the generator 20' (FIG. 12) of the second embodiment, the deflection voltage applied to the deflection electrodes 50 is fixed. This makes it possible to use the common deflection electrodes even when applied to multi-nozzle print heads.

In both the first and second embodiments of generator 20' described above, the charging voltage $V_c$ is varied in response to the energy content of the driving pulse $P_D$ (FIG. 11) in the first embodiment or both of the energy content and the deflection information signal DS (FIG. 12) in the second embodiment. In other words, the charge value q is varied in response to the droplet size (droplet weight m) or to both the droplet size and the deflection information assuming that there is a negligible fluctuation in the velocity $V_x$ of the droplet 16 due to the variations in droplet size.

If the fluctuations in velocity $V_x$ are not negligible, the charge value q, i.e., the charging voltage $V_c$ must be further responsive to the square of the velocity $V_x^2$. The velocity $V_x$ is varied as a function of the droplet size, which is determined by the amplitude and pulse width of the driving pulse $P_D$ applied to the piezoelectric member 15. Therefore, the velocity $V_x$ may be determined for various combinations of amplitude and pulse width. The square of the velocity, i.e., $V_x^2$ may be stored in a digital memory (ROM) having addresses which correspond to the different combinations of amplitude and pulse width of driving pulses $P_D$. A stored value is read out in response to a particular driving pulse and is supplied to one of the charging voltage generators 101, 104, 109 or 104' or to the variable gain amplifier 200 to control the charging voltage $V_c$ or $V_c'$.

The charging voltage generators 101, 104, 104', and 109 may include the digital memory (ROM) in which the various voltage levels are stored in addresses designated by the amplitude and pulse width of the driving pulse $P_D$. The voltage levels may be pre-determined according to the product of the droplet size and the square of the velocity ($V_x^2$).

What is claimed is:

1. An ink-jet printer for recording with droplets of conductive ink on a recording medium in response to an information signal, said printer comprising:

a. an ink chamber means filled with said conductive ink, said chamber driving said droplets out of a nozzle in said chamber in response to driving pulses acting directly upon said chamber, the size of said droplets being responsive to the energy content of said driving pulse as they act directly upon the chamber;

b. means for charging said droplets with a charging voltage after they are driven out of said nozzle; and c. means for generating said driving pulse and said charging voltage, said charging voltage and said energy content of said driving pulse having a relationship responsive to said information signal.

2. An ink-jet printer for recording with droplets of conductive ink on a recording medium in response to an information signal, said printer comprising:

a. an ink chamber means filled with said conductive ink;

b. means responsive to information signals for generating driving pulses, said chamber driving said droplets out of a nozzle in response to said driving pulses, the size of said droplets being responsive to the energy content of said driving pulse;

c. means for charging said droplets with a charging voltage after they are driven out of said nozzle; and d. charging voltage generatng means to vary both said charging voltage and the size of said driving pulse, said charging voltage and said energy content of said driving pulse having a relationship which is fixed responsive to said information signal, whereby the size of said droplets may be changed to produce half-tone pictures responsive to said information signals.

3. The printer of claim 2 wherein said driving pulse and charging voltage generator includes a clock pulse generator means for producing cyclically recurring clock pulses, charging voltage generator means for producing said charging voltage; and pulse width modulator means for producing a pulse width modulation signal, the width of said pulse width modulated signal being a function of the level of an input picture signal.

4. The printer of claim 2 and means for deflecting said ink droplets after they are driven out of said nozzle and charged responsive to said charging means, and deflection signal source means for generating deflection signals, said deflection signal source means being associated with said generating means, the output signal of said deflection signal source means varying said charging voltage in proportion to said deflection signal.

5. The printer of claim 2 wherein said driving pulse and charging voltage generating means includes a variable gain amplifier means for producing said charging voltage, and a deflection signal source means associated with variable gain amplifier means, said variable gain amplifier means varying said charging voltage in response to the output of said deflection signal source means.

6. The printer of claim 2 wherein said driving pulse and charging voltage generating means includes a clock pulse generator means, and said charging voltage generating means has a generally sawtooth output waveform, pulse-amplitude modulator means for producing a pulse-amplitude modulated signal jointly responsive to an externally generated picture signal and to clock pulses from said clock pulse generating means, amplitude-component extractor means responsive to said pulse-amplitude modulated signal for producing a control signal, variable delay means for delaying said pulse-amplitude modulated signal for a time period which is determined by the amplitude component of said pulse-amplitude signal, said driving pulse having an energy content established by the duration of said time period.

7. The printer of claim 6 wherein said charging voltage has a generally stepped waveform.

8. A method of producing half-tone images in an ink-jet printed document comprising the steps of:

a. a modulating driving pulses responsive to information signals which may contain half-tone information;

b. forming and charging ink droplets responsive to said modulated driving pulses, the size and charge of said droplet being varied simultaneously and complementary by said driving pulses in order to be jointly constant responsive to said information signals; and c. deflecting said droplets responsive to said joint constant of said size and charge on said ink droplets, the deflection of said droplets thus being independent of droplet size, whereby half-tones are produced by variations in droplet size.

9. The method of claim 8 wherein step (a) further comprises the added steps of:

(a-1) amplitude modulating cyclically recurring pulses to produce amplitude variation in said recurring pulses according to the half-tone information in said information signals;

(a-2) delaying said modulated cyclic pulses for variable time periods corresponding to said amplitude variation;

and step b. further comprises:

(b-1) generating a voltage signal responsive to said cyclically recurring pulses, said voltage signal varying with time following each of said cyclically recurring pulses; and (b-2) terminating said varying voltage signal responsive to the delay signal of step (a-2) to form said drive pulse, whereby the energy content of said drive pulse is determined by how long said voltage signal may vary between the occurrences of individual ones of said recurring pulses and corresponding ones of said delay signal.

10. The method of claim 8 wherein step (a) further comprises the added steps of:

(a-1) width modulating cyclically recurring pulses to produce time-related variations in said recurring pulses according to the tone information in said information signal; and step (b) further comprises:

(b-1) generating a voltage signal responsive to said cyclically recurring pulses, said voltage signal varying during said time-related variations following each of said cyclically recurring pulses; and (b-2) terminating said varying voltage signal responsive to a trailing edge of said width modulated pulse to form said drive pulse, whereby the energy content of said drive pulse is determined by how long said voltage signal may vary over the width of the modulated pulse of step (a-1).

11. The method of claim 9 or 10 wherein said varying voltage signal has a sawtooth waveform, beginning at a low voltage responsive to one of said recurring pulses and rising linearly to a high voltage at the start of the next one of said recurring pulses.

12. The method of claim 9 or 10 wherein said voltage signal has a stepped waveform beginning at a low voltage responsive to one of said recurring pulses and rising incrementally to a high voltage at the start of the next of said recurring pulses.

13. The method of one of the claims 8, 9 or 10 and the further step of arithmetically computing the square of a droplet velocity and modifying the energy content of said drive pulses responsive to said computed velocity.

14. An ink jet printer comprising means for supplying charged ink droplets upon demand, means for simultaneously varying the size of and charge upon said droplets in a manner wherein the size and charge have a constant relationship, and means for electrically deflecting said ink droplets responsive to said constant relationship, whereby the printer may print tones by varying the size of said ink droplets.

15. The printer of claim 14 and means for computing parameters relating to the path followed by said droplets and means for varying said charge responsive to said computed parameter.

* * * * *